Figure 3:
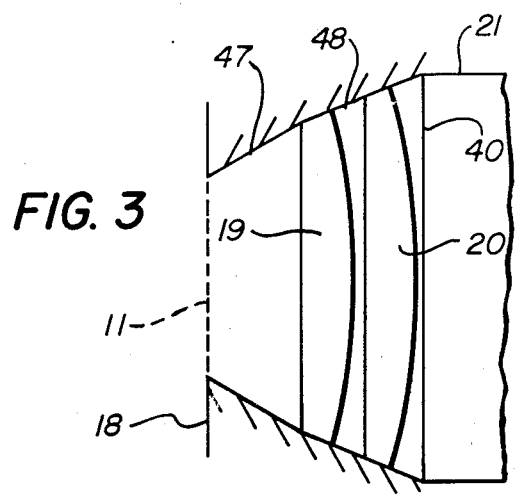

United States Patent [19]

Watt

[11] Patent Number: 4,586,076
[45] Date of Patent: Apr. 29, 1986

[54] SCANNER OPTICS FOR CONTAINING SCATTERED LIGHT

[75] Inventor: Peter B. Watt, Welwyn, England

[73] Assignee: Eastman Kodak Company, Rochester, N.Y.

[21] Appl. No.: 556,235

[22] PCT Filed: Feb. 9, 1983

[86] PCT No.: PCT/GB83/00037
§ 371 Date: Sep. 26, 1983
§ 102(e) Date: Sep. 26, 1983

[87] PCT Pub. No.: WO83/02869
PCT Pub. Date: Aug. 18, 1983

[30] Foreign Application Priority Data

Feb. 12, 1982 [GB] United Kingdom ............... 8204083

[51] Int. Cl.$^4$ .................. H04N 1/46; H04N 9/04; H04N 5/257; H04N 1/028
[52] U.S. Cl. .......................... 358/75; 358/41; 358/50; 358/55; 358/209; 358/225; 358/294; 250/578
[58] Field of Search ............. 313/524, 532, 542, 543, 313/544; 250/237 R, 578; 350/172, 173, 314, 397, 398, 408; 358/41, 50, 52, 54, 55, 209, 211, 214, 215, 216, 225, 285, 293, 294, 75, 76, 78, 80

[56] References Cited

U.S. PATENT DOCUMENTS

| | | | |
|---|---|---|---|
| 1,781,800 | 11/1930 | Baird | 358/225 |
| 2,947,810 | 8/1960 | Horsley | 358/345 |
| 3,035,179 | 5/1962 | Parker | 358/55 |
| 3,617,752 | 11/1971 | Page et al. | 250/209 |
| 3,624,286 | 11/1971 | Bosomworth et al. | 358/167 |
| 3,663,750 | 5/1972 | Besier | 358/214 |
| 4,225,782 | 9/1980 | Kuppenheimer, Jr. et al. | 250/216 |
| 4,481,414 | 11/1984 | Gasper | 250/226 |

FOREIGN PATENT DOCUMENTS

| | | | |
|---|---|---|---|
| 1013423 | 12/1965 | United Kingdom | 358/75 |
| 1273360 | 5/1972 | United Kingdom | |
| 1409153 | 10/1975 | United Kingdom | |

OTHER PUBLICATIONS

Morse, D. R., "A Review of Telecine Systems," *Journal of the SMPTE*, vol. 73, Jul. 1964, pp. 548–560.

Seddon, R. E., "Interference Filters for Colormetric Applications," *Proc. of the Suc. of Photo-Optical Instrumentation Engineers*, vol. 50 (Optical Coatings), Aug. 1974, pp. 153–162.

Primary Examiner—James J. Groody
Assistant Examiner—Randall S. Svihla
Attorney, Agent, or Firm—David M. Woods

[57] ABSTRACT

An optical scanner (10) scans a color transparency (11) with a spot of light from a scanning beam. The light transmitted by the transparency, which is modulated according to the color content and density of the transparency, enters a beam splitter (21, 28) for separation into spectrally-different components. Each component is passed to a photoresponsive detecting device (12, 13, 14). To compensate for scratches and dirt on the transparency, which scatter the transmitted light away from the beam splitter, an internally reflective mirror box (30, 47, 48) defines the optical path to the beam splitter so that scattered light is recovered and enters the beam splitter. The optical path to each photoresponsive device is also contained by a mirrored enclosure (31, 31a, 31b, 32, 32a, 32b).

4 Claims, 4 Drawing Figures

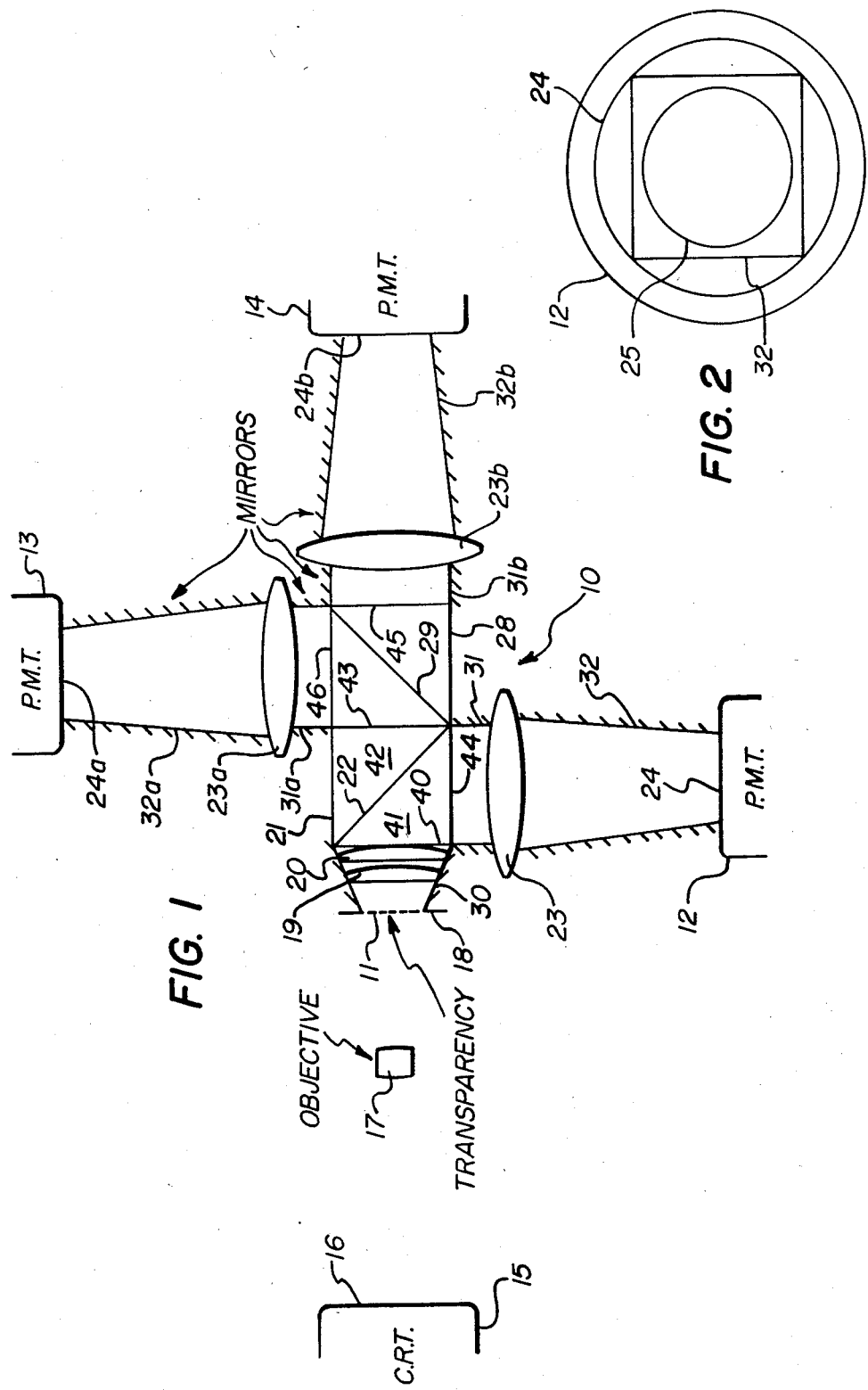

SCANNER OPTICS FOR CONTAINING SCATTERED LIGHT

This invention concerns scanners of the kind where an original information bearing record such as a photographic negative or positive is scanned in a point to point manner by a spot of light and the spot of light is modulated by the information carried by the record. The modulated spot of light is passed to a photomultiplier or like photosensitive device and an electrical signal is generated which corresponds to the instantaneous information carried by the original at that point. Such an apparatus may form part of a telecine apparatus, a photographic printer, a facsimile transmitter or a document copier.

One method of scanning in a point to point manner is to utilise a cathode ray tube and to provide a raster on the face thereof. The raster is imaged on the original information bearing record and the transmitted modulated light, if the original is transparent such as a photographic negative or positive, is detected. It is known, however, to utilise a point light source and appropriate optical components to obtain point to point scanning.

In the case of a transparency, specularly transmitted light causes few problems and a simple optical path, which may include beam splitters, to one or more photomultipliers or like photo-responsive devices, can be used.

One problem that arises in scanners is if the original is dirty or scratched, the light transmitted thereby, if a transparency, is scattered and a proportion is not normally received by the photomultiplier or like photoresponsive device. The output signal of the photomultiplier indicates a high density at such a point on the original and, in a photographic printer where the original is a photographic negative, the reproduction shows a scratch as a white line and a speck of dirt as a white spot. A corresponding readily visible defect appears on the television screen of a telecine apparatus.

An electronic partial solution to this problem in telecine apparatus is described in U.K. Patent Specification No. 1,409,153, and another electronic partial solution to this problem in an electronic motion picture printer is described in U.S. Pat. No. 2,947,810.

The problem is made worse in colour scanners in that optical components are necessary to split the beam of modulated light into, for example, three colour components, usually red, blue and green. This beam splitting may be affected by partially silvered mirrors followed by appropriate colour filters and respective photomultipliers or, more efficiently, by dichroic mirrors and respective photomultipliers both as described in U.S. Pat. No. 2,947,810. In beam splitting, unless arrangements are made to contain scattered light, further light losses occur even when using dichroic mirrors. These losses are far greater for scattered light which does not impinge on the mirrors at or near the design angle, usually 45°. Whenever a scratch or speck of dirt on the original is scanned, the output of the photomultiplier(s) or like photo-responsive device(s) normally drops due to light lost by scattering.

It is an object of the present invention to overcome this problem in a simple optical manner.

In accordance with the present invention, there is provided a colour scanner comprising a gate whereat a transparency to be scanned may be located, means for scanning the transparency in a point to point manner with a spot of light from a scanning beam, a beam splitter located so as to receive light transmitted by the transparency, a photomultiplier or like photoresponsive device located in spaced relationship to each exit of the beam splitter, and internally reflective optical path defining means between the gate and the entrance of the beam splitter.

The optical path defining means may comprise internally reflective mirror boxes and/or lenses for containing and directing modulated light from the transparency or other information bearing record to the entrance of the beam splitter. There may be similar optical path defining means from the exits of the beam splitter to the detecting surfaces of the photomultipliers or like photoresponsive devices.

The beam splitter is preferably of cubic form and of a material of high refractive index such as glass.

Figure 4:
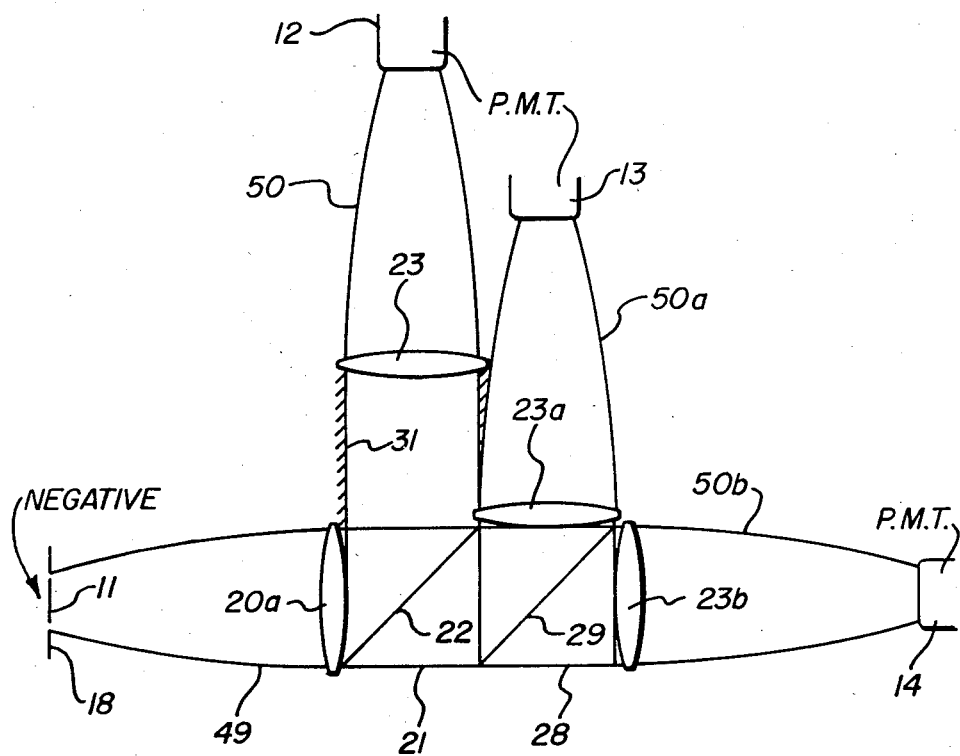

The invention will be described further, by way of example, with reference to the accompanying drawings, in which:

FIG. 1 is a diagrammatic view of a colour scanner incorporating a beam splitter and optical path defining means in accordance with the present invention;

FIG. 2 is a diagrammatic view of the detecting surface of a photomultiplier or like photoresponsive device useful in a scanner having a beam splitter and optical path defining means according to the present invention; and FIGS. 3 and 4 show alternative forms of light collecting and directing means useful in a scanner having a beam splitter and optical path defining means according to the present invention.

As shown in FIGS. 1 and 2 of the drawings, a colour film scanner 10 is arranged to scan a colour transparency 11 (positive or negative) with a beam of light and to provide point to point image information as to the colour content and density of the transparency, in the form of electrical signals at the outputs of three photomultipliers 12, 13 and 14.

The scanner comprises a cathode ray tube 15 and conventional electrical circuits (not shown) which provide horizontal and vertical time bases to produce a raster on the face 16 thereof of relative dimensions at least corresponding to the dimensions of the transparency 11 to be scanned. An objective 17 images the raster onto the transparency 11 located in a film gate 18. Light transmitted by the transparency is collected by optical path defining means comprising a first truncated pyramidal mirror box 30 surrounding the gate 18, and lenses 19 and 20 direct the collected light onto the planar entrance face 40 of a transparent beam splitting cube 21. The cube 21 comprises two equal right angled prisms 41 and 42 of a relatively high refractive index material such as glass. The hypoteneusal surface of one of the prisms 41 or 42 has a dichroic mirror 22 formed as an interference coating thereon of thickness such as to reflect red light incident thereon at approximately 45° and to transmit green and blue light incident thereon at approximately 45°. The prisms 41 and 42 are cemented together with Canada balsam or a like adhesive with the hypoteneusal surfaces in contact along the surface defining the dichroic mirror 22.

The cube 21 has a first planar exit face 43 parallel to the entrance face wherethrough green and blue light transmitted by the dichroic mirror exit the cube, and a second planar exit face 44 at right angles to the entrance face 40 wherethrough red light reflected by the dichroic mirror exits the cube. The second exit face is surrounded by a rectangular box mirror 31 having internal reflecting surfaces which box mirror contains and directs light exiting the cube at the face 44. A lens 23 followed by a truncated pyramidal mirror box 32 directs such light onto the photocathode 24 of the photomultiplier 12.

Abutting the first exit face 43 of the cube 21 is a second similar cube 28 such that the first exit face 43 of the cube 21 constitutes also an entrance face for the cube 28. A similarly formed dichroic mirror 29 transmits green light, entering the cube 28 and impinging on the mirror 29 at approximately 45°, to a first exit face 45 of the second cube 28 and a similar optical arrangement comprising a mirror box 31b, a lens 23b and a truncated pyramidal box 32b collects light exiting the exit face 45 and directs it to the photocathode 24b of the photomultiplier 14.

The dichroic mirror 29 reflects blue light, impinging thereon at approximately 45°, to a second exit face 46 whereat a corresponding optical arrangement comprising a rectangular mirror box 31a, a lens 23a and a truncated pyramidal mirror box 32a collects and directs the reflected light to the photocathode 24a of the photomultiplier 13.

The lenses 19 and 20 and 23, 23a or 23b serve to image the aperture of the objective 17 as a circle 25 (or as a polygon if the aperture is formed as an iris diaphragm) (See FIG. 2) on the respective photocathode instead of imaging the transparency 11. The transparency is deliberately totally defocussed on the photocathode. In this way, a constant area, the circle 25, of fixed location, on the photocathode is illuminated irrespective of the instantaneous location of the spot of light on the transparency 11 and any inequalities of response existing on the detecting surfaces, the photocathodes 24, 24a and 24b, are eliminated.

Providing the transparency 11 is clean and is not scratched, the light from the cathode ray tube passes therethrough specularly and enters the cubes 21 and 28 such as to strike the dichroic mirrors 22 and 29 at an optimum angle of approximately 45°, the design angle of the coating thickness of the interference coating. If there are specks of dirt or scratches on the transparency 11, then light is scattered and/or absorbed thereby. The mirror box 30 collects most of the scattered light and the lenses 19, 20 direct the light such that most of it strikes the entrance face 40 of the cube 21. Any light which enters the cube 21 can only exit therefrom at the exit faces 43 and 44 or 45 and 46. However, scattered light entering the entrance face 40 impinges on the mirror 22 at any angle between 0° and 90° and only a proportion of such light will be in the region of the optimum design angle of 45°.

Thus the dichroic mirror 22 may transmit some scattered red light and reflect some scattered blue and green light. Similarly, the mirror 29 will transmit some scattered blue light and will reflect some green and red light. In total, substantially all of the scattered light entering the entrance face 40 will reach the photomultipliers 12, 13 and 14 and the summed level of the output signals will be such as nearly to equate in value to the average value of the specular signal of the surrounding area of the transparency 11 although the reproduction from such signals will not be of the correct colour. The human eye is much more sensitive to changes in density than to changes in colour in the fine detail of a reproduction and consequently the detectable effects in a reproduction, of scratches and dirt on the transparency 11, are minimised or eliminated.

As some scattered light is always lost and some light is always absorbed by specks of dirt, it is advantageous in a scanner having a beam splitter in accordance with the present invention to utilise an attenuating filter over the area 25 of each photocathode 24 as described in our copending application filed on even date herewith and numbered 8204084.

Instead of the mirror boxes 31 and 32, 31a and 32a or 31b and 32b, the mirror boxes may be all of the form of the mirror box 30 where the lenses are contained within the boxes. Alternatively, as shown in FIG. 3, the mirror boxes may be two stage truncated pyramids, the mirrored sides of the stages 47 and 48 having an obtuse included angle therebetween.

FIG. 4 shows a scanner having mirror boxes 49 and 50, 50a and 50b in the form of compound parabolic concentrators which tend to direct scattered light entering at the narrow end over a wide angular range into less-dispersed light which would enter the entrance face of the cube 21 at approximately 90° thereto. In this figure, similar reference numerals have been used for like parts.

The cube 21, in order to minimise light losses must have a square cross-section in a plane at right angles to its entrance and exit faces. However, in a plane parallel to the entrance face, the beam splitter may have a rectangular cross-section commensurate with or corresponding to the dimensions of the transparency 11 and the gate 18.

Instead of using individual beam splitters seriatim, it is possible to use a beam splitter comprised of crossed dichroic mirrors cemented in a cube.

I claim:

1. An optical scanner for scanning a color transparency with a beam of light, said scanner comprising:
   means for generating a scanning light beam;
   a gate for locating the color transparency in the path of the scanning light beam;
   a beam splitter located in spaced relationship to said gate for receiving light transmitted by the transparency and for separating the received light into a plurality of separate light components having different spectral characteristics, said beam splitter including an entrance for receiving the transmitted light and a plurality of exits through which the spectrally-different components are transmitted;
   a plurality of photoresponsive devices each located in spaced relationship to a respective exit of said beam splitter;
   internally reflective path defining means for enclosing an optical path between said gate the entrance of said beam splitter; and
   means for containing and directing each spectrally-different component from an exit of said beam splitter to a respective photoresponsive device.

2. An optical scanner as claimed in claim 1 in which said internally reflective path defining means comprises a mirror box arranged between said gate and the entrance of said beam splitter.

3. An optical scanner as claimed in claim 2 in which said beam splitter comprises a solid body of highly transparent material with a dichroic mirror embedded therewithin for separating the received light into two spectrally-different light components, said solid body including a plane entrance face for receiving the transmitted light and two plane exit faces through which the spectrally-different components are transmitted.

4. An optical scanner as claimed in claim 1 in which said means for containing and directing the spectrally-different components comprises a plurality of mirror boxes arranged between the exits of said beam splitter and the respective photoresponsive devices.

* * * * *

UNITED STATES PATENT OFFICE
CERTIFICATE OF CORRECTION

PATENT NO. : 4,586,076

DATED : April 29, 1986

INVENTOR(S) : Peter B. Watt

It is certified that error appears in the above-identified patent and that said Letters Patent are hereby corrected as shown below:

Column 4, line 47, after the word "gate" insert ---and---.

Signed and Sealed this

Nineteenth Day of August 1986

[SEAL]

Attest:

DONALD J. QUIGG

Attesting Officer

Commissioner of Patents and Trademarks